C. T. MYERS.
AIR DEFLECTING DEVICE.
APPLICATION FILED NOV. 11, 1916.
1,352,679.
Patented Sept. 14, 1920.
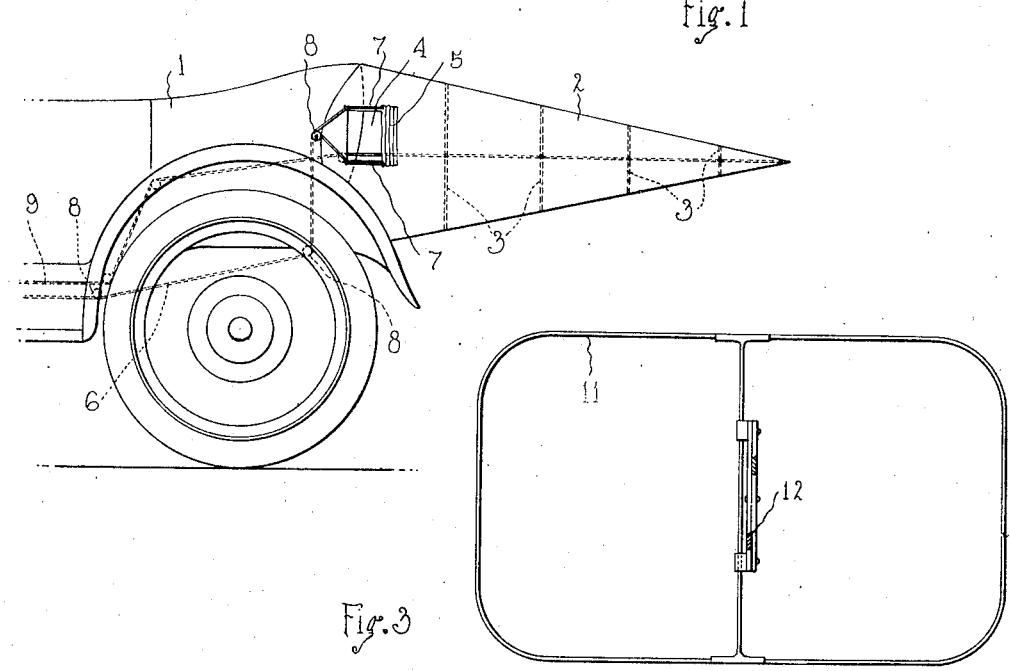
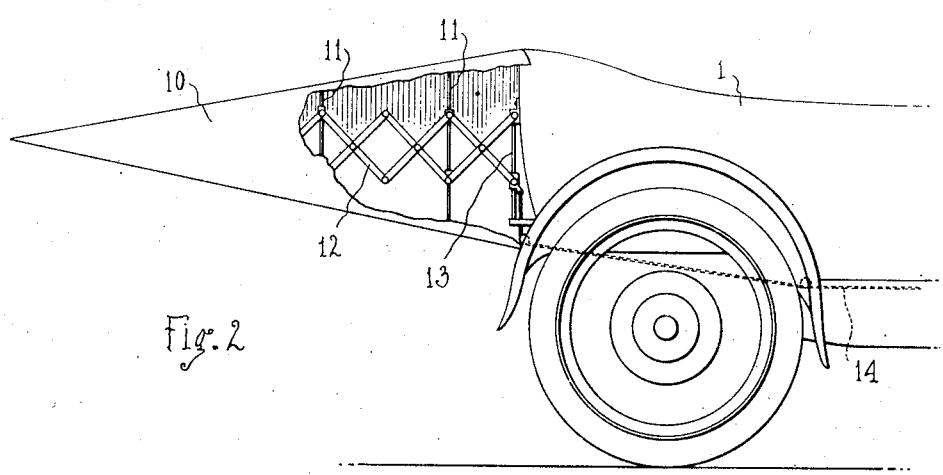
Witnesses
Arthur F. Draper
Karl H. Butler
Inventor
Cornelius T. Myers
By
Attorneys

UNITED STATES PATENT OFFICE.

CORNELIUS T. MYERS, OF DETROIT, MICHIGAN.

AIR-DEFLECTING DEVICE.

1,352,679.   Specification of Letters Patent.   Patented Sept. 14, 1920.

Application filed November 11, 1916. Serial No. 130,715.

*To all whom it may concern:*

Be it known that I, CORNELIUS T. MYERS, a citizen of the United States of America, residing at Detroit, in the county of Wayne and State of Michigan, have invented certain new and useful Improvements in Air-Deflecting Devices, of which the following is a specification, reference being had therein to the accompanying drawings.

This invention relates to an air resistance reducing device, and the primary object of my invention is to furnish the rear end of a vehicle with a novel air deflector which will prevent the formation of eddies of air at the rear end of the vehicle and will also deflect dust and other matter so annoying to the occupants of the vehicle, particularly an automobile operated at high speed or a racing car in which the driver and mechanician are the sole occupants or a railway car, or any other vehicle capable of moving at speeds where the reducing of air resistance or the deflecting of any objectional material or vapor in the air is desirable.

Another object of my invention is to provide a collapsible air resistance reducing device that may be automatically or mechanically distended and collapsed, the device materially reducing and disseminating those air currents that have a tendency to travel in an eddying manner about the rear end of a fast moving vehicle.

The above are a few of the objects of my invention, and reference will now be had to the drawing, wherein there are illustrated the preferred embodiments of my invention, but it is to be understood that the structural elements to be hereinafter referred to are susceptible to such changes, in the size, shape and manner of assemblage as fall within the scope of the appended claims.

In the drawing,

Figure 1 is a side elevation of a portion of an automobile provided with an air resistance reducing device;

Fig. 2 is a similar view showing a device partly broken away and illustrating a modification of my invention; and Fig. 3 is an enlarged cross sectional view of a portion of the same.

In the drawing, 1 denotes a portion of a vehicle body, as that of an automobile, and connected thereto is the large open end of a somewhat conical shaped deflector cover 2, which is preferably made of a light, durable, water-proof and flexible material, for instance, the varnished silk rubber of which balloons are made. In the deflector cover 2 are a plurality of hoops or spreader members 3 stepped in size and suitably spaced to maintain the conical form of the deflector when distended.

At the sides of the deflector cover and at the inner large end thereof are openings 4 adapted to admit air to the cover, and these openings are controlled by valvular members 5, preferably in the form of curtains or bellows shutters which can be shifted to closed position by a cable 6 attached thereto. As shown in Fig. 1, the valvular member 5 is shiftable on a rod 7, and the cable 6 has branches extending along the rods and connected to the upper and lower edges of the valvular member. The cable 6 extends over suitable sheaves or pulleys 8 to the driver's seat of the automobile and it is through the medium of the cable 6 that the openings 4 can be closed to prevent the admission of air to the deflector cover.

Another cable 9 is trained over suitable sheaves or pulleys into the deflector cover and attached to the outer end thereof. With the valvular members 5 in open positions, the cable 9 can be pulled upon to collapse the deflector at the rear end of the automobile, thus permitting of the automobile being readily parked or placed in a garage.

In Figs. 2 and 3 of the drawing is illustrated a slight modification of my invention, wherein a deflector cover 10 has hoops or spreaders 11 and connected thereto is a pantagraph or a series of lazy tongs 12 operatively connected to the rear end of an automobile body as at 13, and adapted to be actuated through the medium of a cable 14. In either construction provision is made for collapsing or distending the deflector and the location and shape of the same is such as to disseminate or reduce those air currents that generally travel about the rear end of a fast moving automobile to form an eddy over the same, which is particularly annoying on account of dust being carried in the air tending to blind the occupants or driver of an automobile. When an automobile is traveling at a moderate speed, for instance, fifteen to twenty miles an hour the deflector is unnecessary and is maintained collapsed, but after greater speed is obtained, the deflector is either manually shifted or automatically distended by air entering the same.

What I claim is: —

1. As a new article of manufacture, a collapsible conical shaped deflector adapted for attachment to the rear end of a vehicle to prevent the formation of eddies of air at the rear end of the vehicle.

2. The combination with a vehicle, of a conical shaped air deflecting device carried thereby and projecting rearwardly therefrom to prevent the formation of eddies of air at the rear end of the vehicle, and means extending into said device and attached thereto adapted for extending and collapsing said device.

3. The combination with a vehicle, of a conical shaped air deflecting device carried thereby and projecting rearwardly therefrom to prevent the formation of eddies of air at the rear end of the vehicle and means extending into said device and attached thereto adapted for collapsing said device.

In testimony whereof I affix my signature in the presence of two witnesses.

CORNELIUS T. MYERS.

Witnesses:
KARL H. BUTLER,
ANNA M. DORR.